April 12, 1955  J. E. WATSON  2,705,836
ARTIFICIAL TEETH AND METHOD OF FORMING THE SAME
Filed July 5, 1949  3 Sheets-Sheet 1
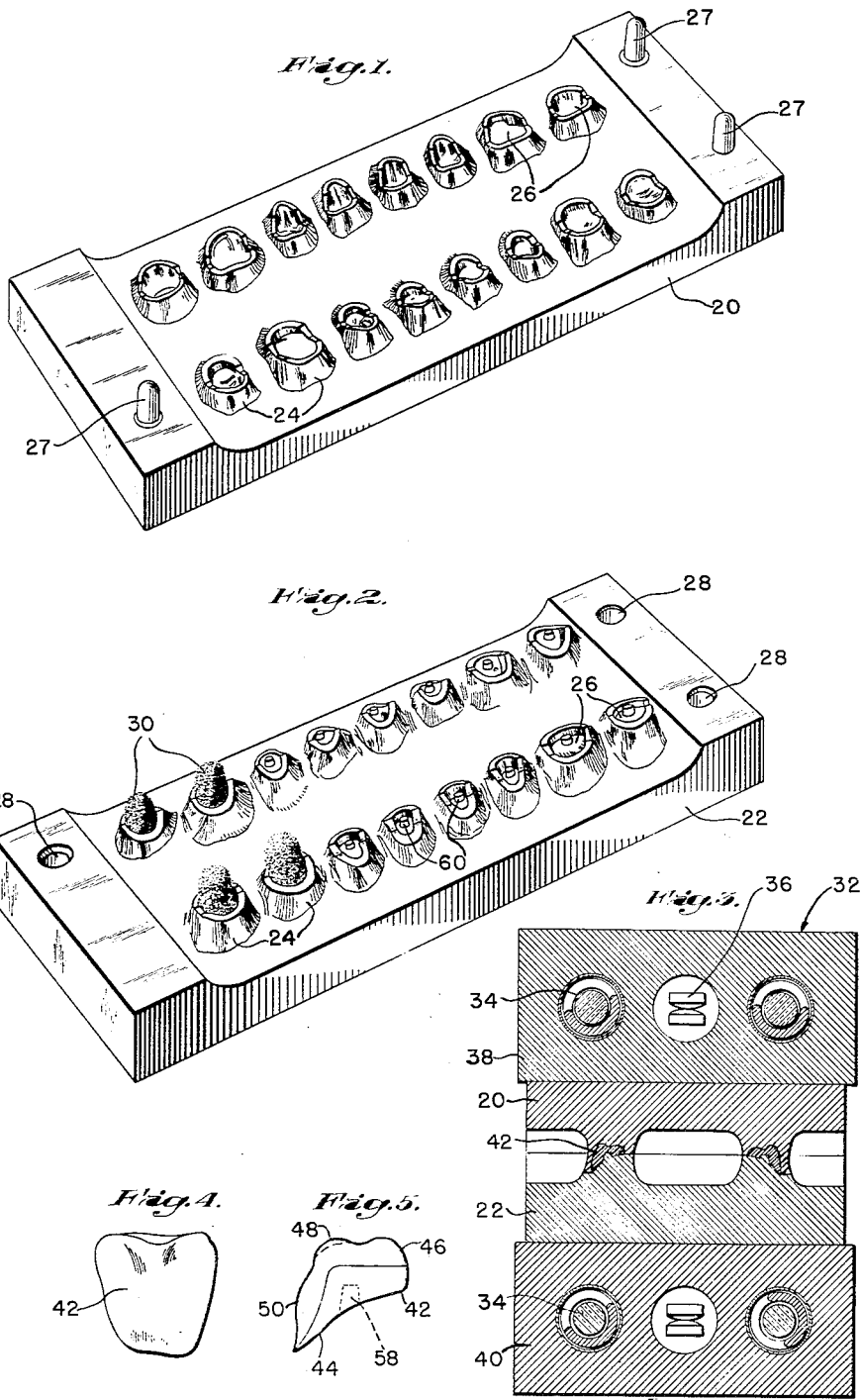

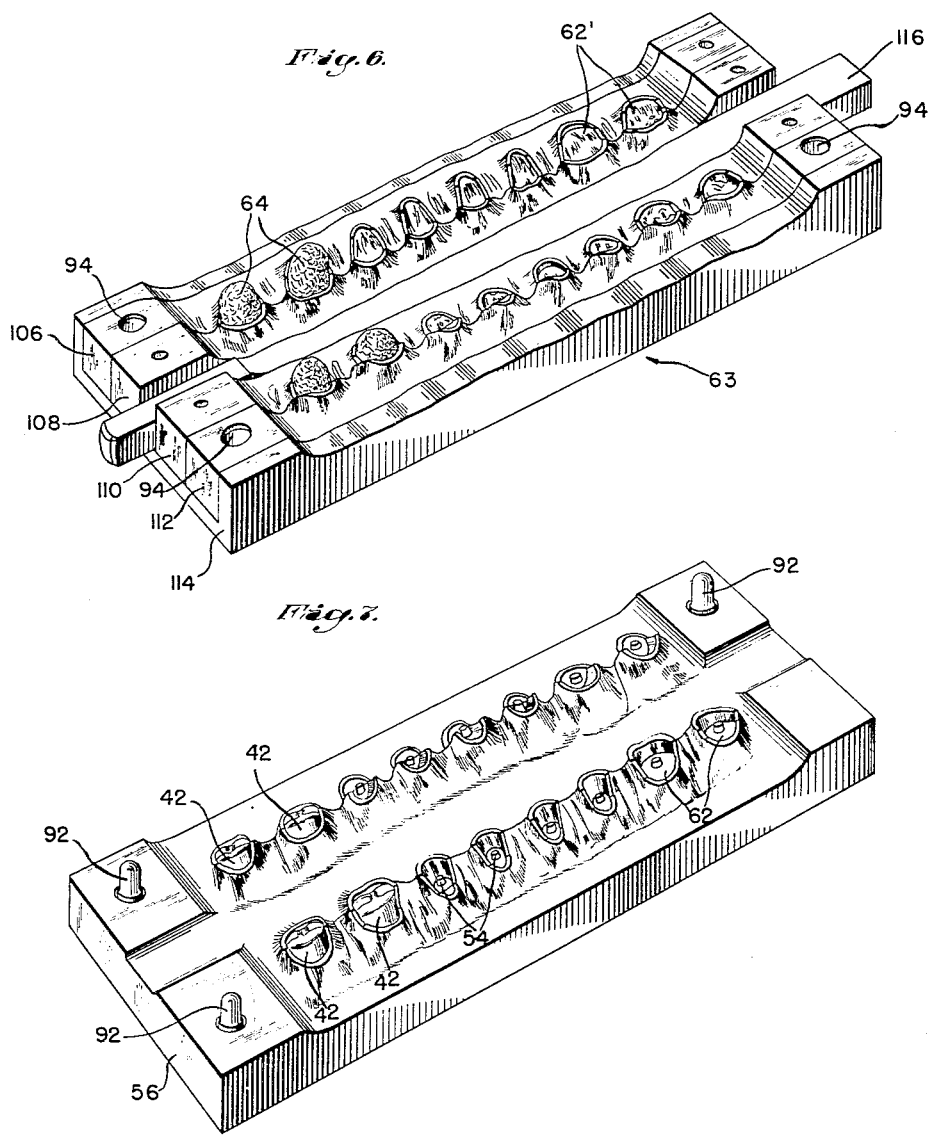

April 12, 1955    J. E. WATSON    2,705,836
ARTIFICIAL TEETH AND METHOD OF FORMING THE SAME
Filed July 5, 1949    3 Sheets-Sheet 3
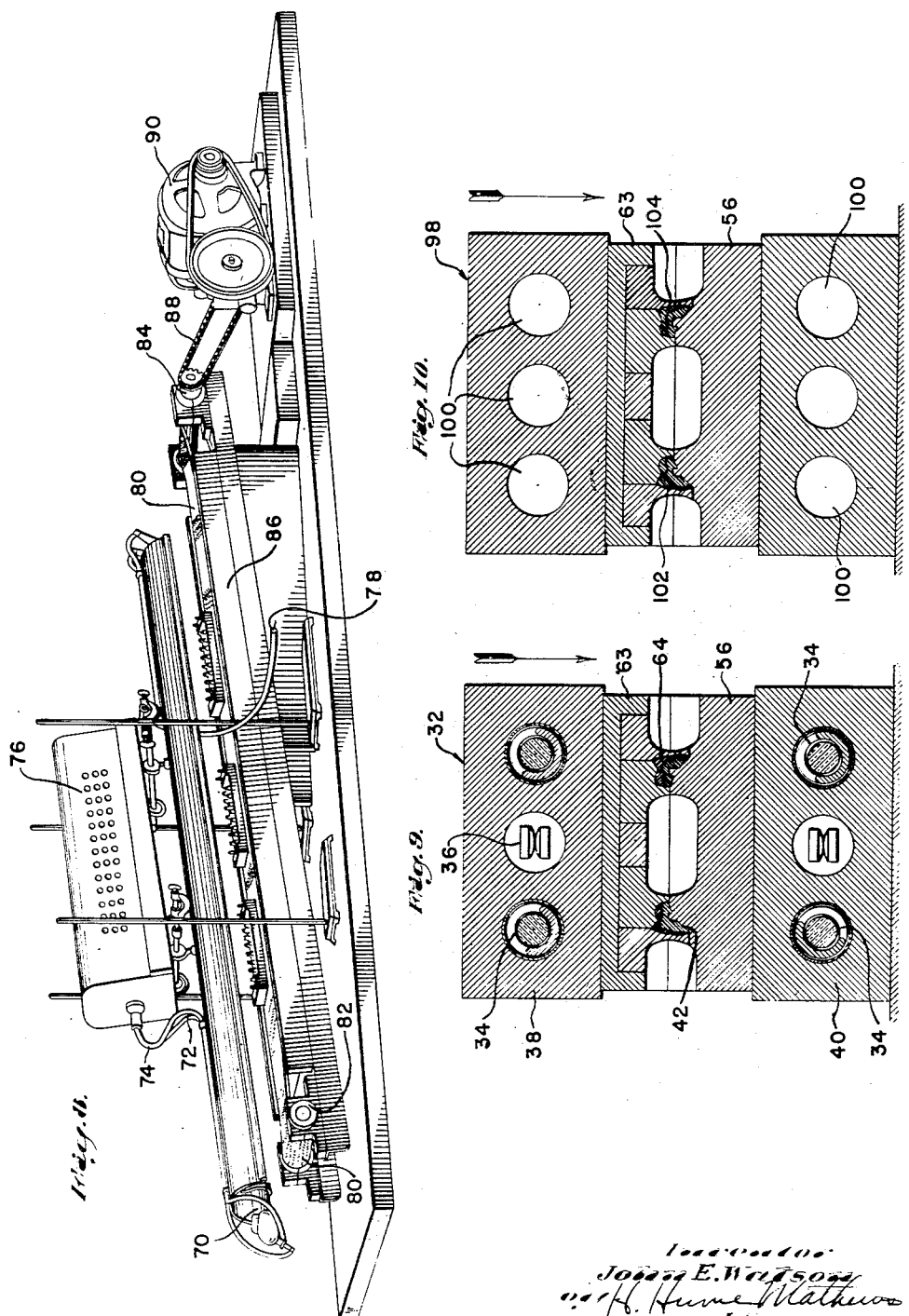

United States Patent Office 2,705,836
Patented Apr. 12, 1955

2,705,836

ARTIFICIAL TEETH AND METHOD OF FORMING THE SAME

John E. Watson, York, Pa., assignor to The Dentists' Supply Company of New York, New York, N. Y., a corporation of New York Application July 5, 1949, Serial No. 103,046

19 Claims. (Cl. 32—8)

This invention relates to artificial teeth, and to a composition, method and apparatus for making the same.

Artificial teeth have for many years been made of porcelain. More recently, teeth composed essentially of acrylic resin have been introduced commercially and these synthetic resin or synthetic plastic teeth now constitute a large part of the total number of teeth manufactured and sold.

An object of the present invention is to provide improvements in artificial teeth of the synthetic resin or synthetic plastic type, and in compositions, methods and apparatus for making the same.

Another object is to provide an artificial tooth composed at least in part of a synthetic plastic which will provide new and improved results in the completed tooth as compared with a tooth composed of one or more of the synthetic materials now conventionally used for such purpose, and to provide a novel process for utilizing such new and improved synthetic tooth material in the manufacture of artificial teeth.

A further object is to provide an artificial tooth which more satisfactorily meets the requirements of denture processing and service use than do the acrylic teeth or synthetic plastic teeth now commercially available.

Another object is to provide improvements in composite teeth, of the type having a face or enamel simulating portion of one material and a body or dentine simulating portion of a different material, and in methods for manufacturing the same.

A further object is to provide a new and improved dental material particularly adapted for use as a surface portion in the incisal or occlusal area of a tooth, or in the enamel part of a tooth; a still further object is to provide a tooth having a surface portion composed of said new and improved dental material.

Other objects and advantages of the invention and a full understanding of the principles thereof will be apparent from the accompanying drawings and the following description of a presently preferred embodiment of the invention, in which:

Figures 1 and 2 are perspective views of face and back mold parts, respectively, which when assembled form a series of mold cavities adapted to form the bodies or dentine simulating portions of artificial teeth constructed according to the present invention.

Figure 3 is a transverse sectional view, through two of the mold cavities, of the assembled mold parts of Figures 1 and 2. The assembled mold of Figure 3 is shown in a heating press and with body tooth material in the mold cavities.

Figures 4 and 5 are front and side views, respectively, of a tooth body part made as shown in Figures 1 to 3 and which is adapted to have a tooth enamel part molded thereto as shown in Figures 6 to 10.

Figures 6 and 7 are perspective views of face and back mold parts, respectively, which when assembled form a series of complete full-sized tooth cavities that may be used to mold enamel tooth parts to or around the body tooth parts as made according to Figures 1 to 3.

Figure 8 is a perspective view of an apparatus for treating the enamel forming material, illustrated in certain of the molding recesses of Figure 6, with ultraviolet light prior to assembling the mold parts of Figures 6 and 7.

Figures 9 and 10 are transverse sectional views, through two of the mold cavities, showing the mold of Figures 6 and 7 in a heating press and a cooling press, respectively, wherein the enamel material is molded and bonded to the previously molded body parts to form a batch of completely molded composite teeth.

It has been proposed in certain prior applications and patents of Henry M. Thornton, assigned to applicant's assignee, to make artificial teeth of synthetic plastics, either thermoplastic resins or thermosetting resins, or combinations thereof. In the Thornton application S. N. 391,687 filed May 3, 1941 (now Patent No. 2,345,305) a process is disclosed for making such teeth by injection molding and in the Thornton application S. N. 403,539 filed July 22, 1941, now abandoned, a process is disclosed for making such teeth by compression molding. Both applications disclose teeth made with separately molded enamel and body portions and it is stated that said portions may be composed of different synthetic resins, if desired.

According to this invention improved synthetic plastic teeth, which preferably have enamel and body portions of different synthetic resin compositions as suggested by the said Thornton applications, may be made. The invention enables a novel synthetic resin tooth material to be used in the manufacture of artificial teeth and particularly as a surface portion in the incisal or occlusal areas of an artificial tooth, or in the enamel simulating portion thereof; and the preferred embodiment or form of the invention described below enables a novel combination of synthetic resins to be used for the enamel and body portions of a composite artificial tooth and provides a novel process and apparatus for manufacturing improved synthetic plastic teeth from a new and improved synthetic tooth material.

Referring to the drawings, Figures 1 and 2 show a compression type mold for making tooth body parts, or tooth portions which represent or simulate the dentine portion of a natural tooth. The mold is similar to those conventionally used in the manufacture of artificial teeth, having a shader or first face part 20 and a back part 22 each containing a number of bosses 24 provided with molding recesses 26 which cooperate when the mold is assembled with guide pins 27 in holes 28, to form mold cavities each of which is of the exact shape and size (except for such provision as may be made for shrinkage of the molded material) as that desired for the body portion of the finished tooth. For convenience in manufacturing and handling, a plurality of such mold cavities are provided arranged in two groups of eight cavities, each group adapted to form the body parts for a set of eight posterior teeth, either uppers or lowers.

Body parts are molded with the mold of Figures 1 and 2 by placing a thermoplastic molding powder 30 such as methyl methacrylate in the molding recesses of the back mold part, in quantities in excess of those required to fill the respective mold cavities, and then closing and simultaneously heating the mold in a heater press as shown in Figure 3. The press 32 is of a conventional type, having electrical heating elements 34 controlled by thermostats 36 so as to maintain the press platens 38, 40 at a predetermined temperature. The mold is kept under compression in the press for a sufficiently long time at a sufficiently high temperature (for instance 1 to 2 minutes at 335° F. With a mold closing pressure of about 1200 to 1500 lbs./sq. in.) to fuse or mold the powder 30 into unitary or homogeneous soft resin masses 42 which, after the mold is removed from the heater press and cooled (preferably done in a cooling press, not shown), may be removed from the cavities as hard, rigid and strong pieces of synthetic plastic which are of the proper size, shape and color to form the dentine simulating portions of artificial teeth. The methyl methacrylate resin itself when mold is a clear transparent plastic so the color (hue, brilliance and saturation) is added by pigments incorporated in the resin or molding powder prior to the molding operation.

Figures 4 and 5 show a tooth body part as made by the steps illustrated in Figures 1 to 3. On the ridge lap or gingival surface 44 (and ordinarily on the lingual surface 46 as well) the body part 42 is of the same size and shape as the finished tooth; however, the occlusal and buccal surfaces 48, 50 (and in some instances the lingual surface) are displaced or located inwardly with respect to the finished tooth contour by varying distances equal to the varying thickness desired for the enamel portion of the tooth. Thus, when body parts formed in the mold of Figures 1 and 2 are placed in corresponding mold cavities of the complete tooth mold, or the finish mold, of Figures 6 and 7 they will be spaced from the occlusal and buccal mold surfaces (and in some instances from the lingual mold surfaces) but they closely fit their respective cavities on the gingival surfaces (and in most instances on the lingual surfaces as well) and are thereby held in position in the cavities. The retention so provided is aided by posts 54 in the back part 56 of the finish mold which posts fit in the diatoric holes 58 formed in the teeth by corresponding posts 60 in the back part 22 of the body mold.

Enamel parts are molded to and chemically bonded with the pre-formed body parts to form complete teeth by the finish mold of Figures 6 and 7. The pre-formed body parts 42 are placed in each of the molding recesses 62 in the back part 56 of the finish mold, wherein they are retained against shifting or displacement by the close fit between the recess walls and their gingival and lingual surfaces, and by the posts 54. The corresponding molding recesses 62' of the face mold part 63 are each filled or packed with a gob of highly viscous liquid or gel illustrated at 64, comprising as an essential ingredient a thermosetting synthetic copolymer forming resin including a polyester of the specific class stated herein below. A quantity of gel is placed in each recess 62' in excess of that required, when taken in connection with the body parts 44, to just fill the mold cavities formed by the recesses 62, 62' when the mold is closed as shown in Figures 9 and 10. This insures complete filling by the gel of the clearances or spaces between the body parts and the walls of the finish mold cavities, the excess material being squeezed out past the parting lines of the mold cavities and the molding material in each cavity being compressed and heated when the assembled mold is closed and heated in the press of Figure 9.

As will be explained more in detail below, the enamel simulating material comprises a special copolymer forming resin which is advanced to the gel stage (or polymerized to a consistency approximating that of a sticky wax or viscid glue) by a catalyst and then maintained in that stage by an inhibitor which substantially stops further polymerization and holds the gel in a condition suitable for (1) placement by spatulating or otherwise in the recesses 62' of the face mold part 63, and (2) bonding to the pre-formed body tooth parts during the molding operation. The gel may then be filled or impregnated with a reinforcing and abrasion resistant material such as glass fiber (the glass fiber may be either uncoated or coated with a synthetic resin as desired) and it also is colored or pigmented so as to provide the proper color and translucency in the enamel tooth part.

After the gel is loaded into the molding recesses, or if preferred just prior thereto, the action of the inhibitor is eliminated, or the gel is treated, so as to cause polymerization thereof to proceed rapidly. This may be accomplished by the ultra-violet machine of Figure 8, which comprises an elongated mercury arc or mercury vapor ultra-violet lamp 70 electrically connected by leads 72, 74 to reactor 76 energized by an input power lead 78. The lamp is suspended parallel to and slightly above a moving belt, which passes over end rollers 82, 84 and is supported intermediate the rollers by a trough or channel framework 86. Roller 84 is driven by the chain-belt 88 and motor 90, causing the conveyor 80 to pass upwardly over the surface of the trough and to carry mold face parts beneath the lamp so that the gel 64 in the molding recesses is exposed to the rays from the lamp for a predetermined time which may be selected, for instance, by regulating the speed of the conveyor belt or merely by proper choice of the point along the length of the conveyor at which the mold face parts are placed on the belt.

When the mold parts are removed from the conveyor after passing out from under the lamp, the gel 64 has again become activated and polymerization is again proceeding rapidly. In fact, the preferred time of treatment is such that the gel becomes noticeably more rigid as it passes under the lamp to the state where it is self-sustaining in form at the time it is removed from the conveyor, though still soft enough to be squeezed out under pressure past the parting lines of the mold cavities when the mold is closed and compressed.

Other means, such as a chemical catalyst or heat, may be employed to destroy or overcome the inhibitor or eliminate its action. However, a catalytic light treatment, preferably used in conjunction with a polymerization catalyst added to the gel just prior to said treatment, is preferred. The ultra-violet light treatment can be done at room temperature and is of such nature that the resin gel can be so processed without fear of over advancement of polymerization. Intensity of the light ordinarily is fixed, so it is best to control the re-activating process by regulating the time during which the gel is subjected to the action of the light rays. This factor is adjusted until the gel in the mold face part is sufficiently rigid to substantially retain its form or to resist gravitational flow when the mold part 63 is removed from the conveyor, inverted over the back mold part 56 and assembled by fitting the guide pins 92 into the holes 94. For example, a light treatment of about 5 to 20 minutes with a 450 watt Cooper-Hewitt mercury vapor lamp spaced about 3 inches from the gel has been found satisfactory.

After the gel is light treated and the mold is assembled it is closed, compressed and heated in the press 32, where the gel or enamel forming material is molded or cured and chemically inseparably bonded to the previously molded body part resin. For example, a curing time of about 3 to 10 minutes at a mold temperature of about 225° F. to 300° F. and a mold closing pressure of about 50 to 100 lbs./sq. in. has been found satisfactory. Upon removal from the heating press the mold may be placed in the cooling press 98 (Figure 10), where it is preferably kept under at least a slight pressure and cooled by coolant in passages 100 of the press platens until the teeth 102, composed of the face parts 104 and body parts 42, are cooled to a temperature sufficiently low to enable them to be removed from the mold and handled.

Removal of the teeth from the mold may be facilitated by making the face mold part 63 in five parts as shown in Figure 6. The eight molding recesses of one row are formed in a pair of separable bars 106, 108 and the eight recesses of the other row are formed in a like pair of bars 110, 112, the whole being assembled in a backing piece or frame 114 and locked therein for molding by a central wedge member 116. After a molding operation is completed wedge 116 may be knocked out of the mold enabling the bars 106, 108 and 110, 112 to be separated easily from each other and from the composite teeth in the mold cavities.

The body part 42 of a composite tooth (which is the presently preferred embodiment of the invention) made as illustrated in Figures 1 to 10 is composed of a moldable material having: (1) optical qualities such that it either is or may be colored or pigmented to provide a dentine simulating tooth portion which, when viewed with the enamel simulating portion in place, will provide a pleasing or natural appearing artificial tooth, (2) physical and chemical properties which enable it to be easily molded to a form adapted for use in the mouth having high strength and sufficient rigidity and resistance to flow and creep to insure stability of shape and size under denture processing and service conditions, and which has adequate immunity against deterioration through temperature changes, aging or attack by fluids, or by materials and forces which enter into or are present in processing and in the oral cavity, and (3) the capability of being securely or inseparably bonded in its molded or cured state with the denture base material, preferably by combining, fusing or uniting with said base material during processing of the denture; and the capability of being securely or inseparably bonded with the tooth enamel material, preferably by combining, fusing or uniting with said enamel material during the tooth molding process. For example, the following synthetic plastics are found satisfactory for use as body part material, though other moldable materials having these qualities and properties are available and may be used as well: acrylic resins such as methyl methacrylate and ethyl methacrylate, polystyrene, cellulose acetate, nylon (polyamide resin), polyvinyl chloride, vinyl acetate, and a vinyl acetate-vinyl chloride copolymer, or mixtures or copolymers thereof. Specifically, methyl methacrylate, for example commercial methyl methacrylate molding powder, is presently preferred, particularly when used for body parts of teeth to be processed to the conventionally used acrylic denture base or plate material. Body parts comprising methyl methacrylate as the major constituent not only have exceptionally good optical, chemical and physical properties, but also insure the inseparable connection or fusion of the tooth to the denture base, by any of the easily practiced well-known ways for securing parts of this thermoplastic acrylic resin together, such as by the use of an acrylic resin monomer solvent or cementing agent, by fusion under heat and pressure or both. The body material ordinarily is substantially all resin (except for body color or pigment), used as a molding powder illustrated at 30 in Figure 2. However, materials and/or fillers for increasing strength, rigidity, heat stability, hardness, craze resistance, abrasion resistance, etc., may be added as either particles or fibers to the body forming material. Also, the body parts can be cast, injected or transfer molded by processes conventionally used for molding synthetic resins, rather than being compression molded as shown in Figures 1 to 3. A partially polymerized moldable gel or a liquid monomer rather than a polymer powder may be used. Though it is presently preferred that the body resin be pre-formed before the enamel gel is molded thereto the body resin need not be completely pre-molded or pre-cured; in some instances the cure or polymerization of the body resin may partially be done in the pre-forming process and then completed in the finish mold simultaneously with the final cure of the enamel forming resin, or both the enamel and body tooth portions may be simultaneously formed and molded or completely and finally cured in a single molding operation. Also, the enamel gel may first be pre-formed and subsequently cured and molded to the body part resin.

The gel 64, and consequently the tooth enamel part 104, is composed of a novel dental material or composition which when finally cured forms a thermoset copolymer having as a major constituent (about 50% or more by weight) an unsaturated polyester of a specific class copolymerized with an olefinically unsaturated monomer as a minor constituent. This copolymer has been found, according to this invention, to provide greatly improved properties or results particularly when used in the surface or enamel portion of a tooth and, when used in combination with a body part of a synthetic plastic which will readily adhere, fuse or bond to the denture base, for the composite tooth as a whole. Its composition can best be characterized as a thermosetting resin which when completely polymerized or cured is a copolymer of an olefinically unsaturated monomer containing at least one $>C=CH_2$ group with an unsaturated polyester of a dihydric alcohol and an alpha-beta ethylenically unsaturated dicarboxylic acid or anhydride. The unsaturated monomers are best typified by styrene, diallyl phthalate and vinyl acetate. The dihydric alcohols are typified by propylene glycol and ethylene glycol and the unsaturated dicarboxylic acids or anhydrides are best typified by maleic and fumaric, but itaconic and others are operable.

In the preparation of the resin which is first advanced to the gel stage and then reinforced with glass or similar abrasion resistant fiber and molded to form a reinforced copolymer constituting the enamel part of the tooth, an unsaturated polyester is prepared in accordance with the practice conventionally employed in the preparation of alkyd resins, from a dihydric alcohol and an alpha-beta ethylenically unsaturated dicarboxylic acid or anhydride as described above. Some of the unsaturated dicarboxylic acid or anhydride may be substituted with a functionally saturated dicarboxylic acid (for example phthalic acid) to modify the properties of the alkyd type base, or polyester, if desired. The unsaturated polyester is then mixed with the olefinically unsaturated monomer as a reactive carrier, an inhibitor being added at the same time to prevent premature or uncontrollable polymerization. The relative proportion of olefinic monomer in the mixture or polyester-monomer solution is subject to wide variation but should be within the range from about 10% to about 50% by weight of the mix. The inhibitor may be one of those conventionally used for the purpose. Quinones and polyhydric phenols are suitable; tertiary butyl catechol may be used, for example in amounts of about 0.01% added to the time the polyester is mixed with the olefinic monomer. Formation of the unsaturated polyester by the condensation of the dicarboxylic acid and the dihydric alcohol provides a long chain unsaturated compound which is capable of polymerization to form cross-linked three dimensional structures. When this polyester is dissolved or mixed with the olefinically unsaturated monomer, and the two substances are then completely cured or polymerized, the resultant compound is a rigid solid thermoset copolymer of complex structure and composition.

Certain specific compositions falling within the above generic definition of the thermosetting material from which the tooth enamel part is molded have been found particularly valuable or useful for this purpose. The following are given, without limitation of the invention to the specific materials or proportions or details of manufacture stated, as illustrative examples of such particularly preferred compositions that have been found to provide exceptionally good results when used as dental materials in accordance with the invention:

EXAMPLE I

*Gel or enamel part forming material*

A copolymer-forming liquid resin is prepared by mixing 3100 parts by weight of styrene (as the olefinically unsaturated monomer) with an unsaturated polyester of a dihydric alcohol and alpha-beta ethylenically unsaturated dicarboxylic acid formed by the reaction of 2686 parts by weight of propylene glycol and 1575 parts by weight of maleic acid modified with 2378 parts by weight of phthalic acid. A gelation inhibitor (for instance tertiary butyl catechol in amounts of about 0.01% by weight of the mix) is added at the time of mixing.

EXAMPLE II

*Gel or enamel part forming material*

A copolymer-forming liquid resin is prepared as in Example I, except that 3180 parts of styrene are used and the polyester consists of 2930 parts of maleic acid and 3344 parts of propylene glycol, the phthalic acid being omitted.

EXAMPLE III

*Gel or enamel part forming material*

A polyester is prepared by conversion of the following, in parts by weight:

| | Parts |
|---|---|
| Fumaric acid | 7 |
| Maleic anhydride | 1 |
| Phthalic anhydride | 1.2 |
| Ethylene glycol | 3.3 |
| Propylene glycol | 2.3 |

After conversion of the polyester, this composition is mixed with 5.75 parts of styrene to form a resin which is paste-like at room temperature and which is a liquid at higher temperatures, above 60° C. to 70° C. An inhibitor is added at the time of mixing as in Examples I and II.

EXAMPLE IV

*Gel or enamel part forming material*

A polyester is prepared by conversion of the following, in parts by weight:

| | Parts |
|---|---|
| Fumaric acid | 7 |
| Ethylene Glycol | 3.3 |
| Propylene glycol | 1 |

After conversion of the polyester, this composition is mixed with 8.7 parts of diallyl phthalate to form a paste-like resin which thins upon heating to a readily flowable liquid, as in Example III. An inhibitor is added at the time of mixing, as in Example I.

Copolymer forming resins composed of an olefinically unsaturated monomer mixed with an unsaturated polyester of a dihydric alcohol and alpha-beta ethylenically unsaturated dicarboxylic acid for use according to the invention as a tooth composition or material are ordinarily liquids of relatively low viscosity at their molding temperature (also at room temperature in the case of the resins of Examples I and II). This excessive liquidity at the molding temperature and the relatively long curing or polymerization time required to mold the raw or untreated resin, plus the fact that once gellation starts it continues very rapidly and almost uncontrollably, interferes to some extent with the usefulness of the resin in the production molding of artificial teeth. However, this difficulty has been overcome and other advantages obtained according to the present invention by a preliminary treatment of the resin (for instance the liquid resin of Examples I and II or the paste resin of Examples III and IV) first with a peroxide type polymerization catalyst such as tertiary butyl hydroperoxide in proportions up to 2% by weight of the resin (if desired the mixture may be heated over a water bath) until the resin has thickened to the gel stage, forming a tacky viscid paste having a consistency similar to or approximately that of a sticky wax or jelly-like glue, and then stopping further gellation by the addition of an inhibitor such as tertiary butyl catechol in amounts of from $1/1000$ to $1/10$ to $1\%$ by weight of the resin, to retard or substantially prevent further polymerization. The addition of the inhibitor is best carried out by dissolving it in a small amount of the untreated liquid or non-gelled resin and then mixing the resultant solution with the gelled resin. By proper choice and manipulation of catalyst and inhibitor, a gel having a sufficiently long shelf life and sufficiently short yet adequate and controllable working time may be prepared. The preliminary treatment of the liquid resin to form a viscid gel in this manner provides other important advantages, in addition to facilitating molding. By the use of a stiff gel, as compared to the relatively low viscosity liquid resin, shrinkage of the enamel during curing is considerably reduced. Further, the gelled material may be packed and compressed in the mold cavities thereby eliminating or reducing porosity in the cured enamel. Besides curing, the catalyst has a desirable decolorizing or bleaching effect on the resin. Fillers such as glass fibers when added to the gel, rather than the liquid resin, may be much more readily and completely dispersed as discrete fibers uniformly throughout the enamel or face part material. The inhibitor used decomposes at about 70° C. and therefore does not interfere with the final cure, which is effected at a considerably higher temperature.

In molding teeth according to the invention a polyester-monomer resin solution or mix is first prepared, of a composition in the aforementioned class and which is preferably like those of Examples I to IV. A catalyst is then added and when polymerization or formation of the copolymer has progressed to the gel stage as described above further gellation is stopped by the addition of an inhibitor. Polymerization to the gel stage may be speeded up, if desired, by the addition of an accelerator or promoter along with the catalyst. The gel so formed may then be stored, if desired, for periods of about 8 hours at room temperature and up to about four weeks or even several months under refrigeration. At any time after the gel is formed, and before molding is ready to begin, the gel is mixed with glass fiber filler, by spatulating or with the aid of a mixer such as the Hobart type. Also, it is best to further treat it with additional catalyst, such as tertiary butyl perbenzoate, preferably added just before molding is ready to begin. The glass fiber may be used either coated or uncoated. If coated, the coating is applied to the fiber during its manufacture in a known manner, before the fiber is mixed with the gel. The coating material may be applied in any convenient thickness, for example in an average amount of about .02% by weight of the fiber, and it preferably is a synthetic resin that will bond to the copolymer, such as a dimethacrylate resin (Du Pont's BCM). The fiber is preferably used in lengths of from about $1/100$ inch to about $1/4$ inch and diameters of from about .00004 inch to about .001 inch and in the range from about 1% to about 25% by weight of the filled gel. While a glass fiber filler is preferred, other fillers may be used such as powdered glass, powdered minerals such as feldspar, and particles or fibers of porcelain, metal and synthetic plastic materials and particles of aluminum oxide or silicon carbide.

The first step of the molding operation is to press or otherwise place the filled gel (to which additional catalyst has preferably just been added) in the recesses 62' of the face mold part, as shown at 64 in Figure 6. The face mold part with the exposed gel masses thereon is then placed on the conveyor and carried beneath the lamp 70 (Figure 8), subjecting it to the catalytic action of the rays from the mercury vapor lamp, for a predetermined length of time. The catalytic action of the lamp rays on the gel material overcomes or destroys the inhibitor, rendering it ineffective, and causes polymerization to begin again, or to again proceed rapidly. Gellation or formation of the copolymer therefore advances as the gel material moves along the conveyor and when the face mold part is removed from the conveyor the material has hardened or cured to a rubbery mass which is sufficiently viscous and stiff or form retaining to retain its shape and place in the mold recesses while the face mold part is inverted and placed over the back mold part in which the body parts 42 have previously been inserted in proper position. The gel is still, however, sufficiently soft to flow under pressure and to wet the exposed surfaces of the body part 42 when the mold is assembled and compressed, thus bringing the gel and the pre-formed body resin into intimate contact and insuring the creation of an inseparable bond between the two materials during the subsequent molding operations. The cure or polymerization of the gel, and the inseparable bonding thereof to the pre-formed body material, are completed in the heating and cooling presses as shown in Figures 9 and 10. In case difficulties arise in forming a secure bond between the face and body tooth parts, the body parts when in place in the back part of the finish mold may be painted or coated on their exposed surfaces just prior to assembling the mold with a thin film of the untreated or non-gelled enamel resin, to insure complete wetting of the body by the gel.

The following are illustrative specific examples of certain presently preferred procedures in accordance with this invention for molding composite artificial teeth, with the apparatus and compositions described above.

EXAMPLE V

Gel preparation and molding procedure

First, a set of tooth body parts are molded with methyl methacrylate molding powder as illustrated in Figures 1 to 3, with about 1500 lbs./sq. in. pressure on the mold and for approximately 2 minutes at about 335° F. The resulting body parts are placed in the corresponding recesses of the back mold part 56 as shown in Figure 7. This may be done either before or after preparation of the gel as will be next described. Second, to a liquid resin as prepared in Example I is added approximately 1½% by weight of the catalyst tertiary butyl hydroperoxide, which catalyst has a desirable decolorizing or bleaching effect on the resin. The bleach takes place during the curing process, the completely polymerized resin being practically water white (except due to color from any pigments added) when cured with this catalyst. The catalyst causes the liquid resin to polymerize. Heat may be applied, with some catalysts, to accelerate or promote polymerization. But a smoother product can be obtained, in many instances, by maintaining the resin at room temperature during gellation. About .01 of 1% of a promoter or accelerator such as a mercaptan is added to speed up gellation. Polymerization is allowed to continue for about 20 minutes to one hour until a gel like mass is formed which while stiff can still be stirred or spatulated. Gellation is then stopped by thoroughly mixing into the gel a solution of about .05% of the inhibitor tertiary butyl catechol dissolved in a small amount of the untreated liquid resin. About .12% by weight of a synthetic resin coated glass fiber within the diameter and length range given above is mixed in, after which the resulting fillled gel is ready for molding. Third, when ready to load the gel in the mold about ¼ of 1% of a second catalyst such as tertiary butyl perbenzoate which is resistant to high temperatures (molding temperature) is first added to the gel from step (2) and the gel is then placed in the mold recesses and is exposed to the catalytic action of ultraviolet light from a mercury vapor lamp. After about 14 minutes of such exposure the face part mold containing the gel is assembled with the back part mold containing the acrylic body parts and the assembled mold is placed under compression (about 100 lbs./sq. in.) in a heater press, where it is heated to a temperature within the range from about 210° F. to about 335° F. and maintained at that temperature for a time within the range from about 25 minutes to about 2 minutes, completing the cure of the gel to form the thermohard copolymer. Preferably a temperature of about 250° F. and a time of about 15 minutes is used. The mold is then placed in the cooling press and maintained under compression until the teeth are cooled sufficiently for removal from the mold. Molding by this method gives the partially polymerized copolymer or gel a chance to wet the exposed surfaces of the acrylic body before the cure is completed. The acrylic softens and is partially soluble in the gel material, thereby insuring good bonding. Provision of a cement is ordinarily not necessary or advisable; by molding the thermosetting enamel forming material over the pre-formed body as described, and in some instances coating the body parts just prior to assembly of the mold with the ungelled resin, an inseparable bond may be formed which is stronger than the composite tooth itself. Color is added to both the body and enamel materials before molding, in a manner well known to those skilled in the art, to provide a finished tooth having a relatively opaque body and a relatively translucent or transparent enamel.

EXAMPLE VI

Gel preparation and molding procedure 100 grams of the commercial resin "Selectron" #5003, (a polyester liquid resin formed by reacting ethylene glycol, maleic anhydride and styrene and manufactured and sold by the Pittsburgh Plate Glass Co.) is treated or blended by mixing with one drop of the commercial accelerator "Selectron" #5907, which is similar to "Selectron" #5003 but also includes an amine type accelerator and is manufactured and sold by the Pittsburgh Plate Glass Company. Eight drops of the catalyst tertiary butyl hydroperoxide are then added and mixed and the material is allowed to stand for about 45 minutes or until it thickens to a fairly stiff gel, barely capable of being stirred or worked with a spatula. Gellation is then stopped by the addition of about .03% by weight of the inhibitor tertiary butyl catechol dissolved in a small amount of untreated #5003 resin, which retards or prevents further polymerization. Glass fibres of approximately ⅛" length and coated with a glycol dimethacrylate are then mixed with the inhibited gel by spatulating or with a power operated mechanical mixer, in an amount by weight of about 9.1%. The resulting filled gel has the following approximate composition, by weight:

90.7% "Selectron" #5003 resin
.025% "Selectron" #5907 accelerator
.16% tertiary butyl hydroperoxide catalyst
9.1% glass fiber The gel thus prepared may then be stored for a reasonable time, preferably under refrigeration, until it is needed for molding as in Figures 6 to 10. Just prior to the molding step of Figures 6 and 7 the gel is given another catalyst treatment by mixing into the batch approximately 25 drops of the catalyst tertiary butyl perbenzoate, or an amount equal approximately to ¼ of 1% by weight of the batch. The resulting material is then subjected for about 14 minutes to ultra-violet light as shown in Figure 8, the mold is assembled with the gel in the face mold part and acrylic body parts in the back mold parts and closed in a press as shown in Figure 9, where the enamel tooth material is cured for about 10 minutes at 225° F. At the end of this time the mold may be transferred to a cooling press as in Figure 10. After cooling the mold is opened and the resulting composite teeth, having a thermoset enamel bonded to a thermoplastic body, are removed from the mold cavities ready for trimming, polishing and carding. The acrylic body parts in the back part mold may be coated with a thin film of raw or ungelled "Selectron" #5003 just before the mold is assembled and closed, to improve the strength of the bond between the enamel and body parts, as cured. In addition, or alternatively, the enamel contacting surfaces of the body parts may be roughened, knurled or pitted before the gel is molded thereto, to provide a mechanical as well as a chemical bond between the enamel and body resins. Color is added to both the body and enamel compositions, preferably by incorporating a dye or pigment therein before molding.

EXAMPLE VII

Gel preparation and molding procedure

A gel is prepared as in Example VI, with the following ingredients:

600 grams "Selectron" #5003 resin
9 drops "Selectron" accelerator #5907
60 drops catalyst tertiary butyl hydroperoxide
.180 gram inhibitor tertiary butyl catechol dissolved in approximately 5 grams of #5003 resin The 600 grams of #5003 resin described above in Example VI is placed in a mixing bowl and beaten as the accelerator is added. The catalyst is then added, drop by drop, and the rate of addition controlled or manipulated so that the resin thickens to a gel in about an hour and a half. If gellation proceeds too slowly catalyst may be added more rapidly, if gellation is too fast catalyst addition may be temporarily discontinued while beating continues. Air thus beaten into the resin acts like an inhibitor and slows up polymerization or gellation. The inhibitor mix is then added and beaten in, for about 1 minute, after which 60 grams of resin coated glass fiber coated with a glycol dimethacrylate is beaten in for about 3 minutes. A portion of the fiber treated resin is then removed from the bowl and spatulated with enamel color (.288 gram of yellow pigment and .192 gram of titanium dioxide) and this colored material is then returned to the bowl and blended in by beating for a further period of 3 minutes, or until the glass fiber and color are well dispersed uniformly throughout the gel, which is then ready for temporary storage and subsequent molding.

EXAMPLE VIII

Gel preparation and molding procedure 100 grams of "Selectron" #5403 (a commercial polyester paste resin formed by reacting a mixture of phthalic acid and fumaric or maleic acid with either ethylene or propylene glycol and diallylphthalate and manufactured and sold by The Pittsburgh Plate Glass Co.) is placed in a glass container, and heated over a water bath until it liquifies. 1% by weight of the catalyst benzoyl peroxide is then added and heating is continued until a gel is obtained. The inhibitor tertiary butyl catechol is added to the gel in an amount equal to about ⅒ of 1% by weight of the mixture. This stops polymerization. About 12% of glass fiber within the length and diameter range stated above and coated with phenol-formaldehyde resin or nylon (a commercial polyamide resin) is mixed in the inhibited resin and enamel color is added. When ready to begin molding additional catalyst is mixed into the gel as prepared above and it is then further advanced by heat or light and molded or cured at 200° F. for fifteen minutes.

EXAMPLE IX

Gel preparation and molding procedure

The aforementioned resin, "Selectron" #5003 is advanced to a gel with the aid of accelerator and catalyst as follows: 200 grams of resin is placed in a 600 cc. beaker. To the contents in the beaker 2 drops of the aforementioned accelerator #5907 and 10 drops of tertiary butyl hydroperoxide are added and thoroughly mixed. The resin is allowed to stand until it thickens to the proper gel consistency. To stop further gellation, .03 of 1% tertiary butyl catechol is then added. The gelled resin is treated with 10% glass fiber within the length and diameter range stated above and coated with either butyl methacrylate resin, polyvinyl butyral resin, polyvinyl acetal resin, or polyvinyl formal resin. The desired quantity of enamel color is then added. When ready for molding, tertiary butyl perbenzoate is added and mixed in an amount approximately equal to 5 drops of catalyst for each 10 grams of treated resin. A posterior mold part as in Figure 6 is then loaded with the filled gel and placed on the conveyor as in Figure 8. One pass under the conveyor of about 14 minutes is enough to advance the material to a rubbery condition in which it is ready to be molded. While the material is passing under the light, the previously formed acrylic slugs or body parts in the ridge lap half of the finish mold are coated with raw or ungelled #5003 resin. The mold is then assembled, placed in the press and cured at 250° F. for 10 minutes. After cooling by plunging in cold water it is opened and the completely molded teeth are removed. The catalyst tertiary butyl perbenzoate used in the second stage of the polymerization is preferred for the final cure because it decomposes at a higher temperature than tertiary butyl hydroperoxide.

EXAMPLE X

Gel preparation and molding procedure

A three piece mold is used, consisting of a face part 63 of the finish mold, a shader part 29 and a back part 56 of the finish mold as illustrated in the drawings (see Thornton Patent No. 2,345,305, Thornton application S. N. 403,539 filed July 22, 1941, and Clapp Patent No. 1,547,643 for more details of this type of mold) is used. The shader and back parts are placed on a hot plate and heated to 360° F. Acrylic resin molding powder mixed with body color to simulate the dentine part of the tooth is placed in the mold cavity recesses and the hot mold is closed and compressed at a relatively high pressure in a cold press, where it is held under compression until cooled to room temperature. The shader mold part is then removed, leaving the molded acrylic body tooth parts in place in the back mold part. The face mold part is then loaded with a thermosetting resin gel colored to represent the enamel part of the tooth and both the gel containing face mold part and the back mold part with the acrylic tooth bodies are heated to 150–160° F., in about two minutes. The face and back mold parts are then assembled and closed and compressed at a relatively low pressure in a hot press and heated therein at 225° F. for twenty minutees, at 260° F. for ten minutes, or at 300° F. for five minutes. The mold may then be cooled, opened and the composite teeth removed. The gel that is placed in the face mold part is prepared by adding from $\frac{1}{10}$ of 1% to 1% by weight of tertiary butyl hydroperoxide to #5003 "Selectron" resin described hereinabove, heating to 60° C. over a water bath for about 10 minutes, and then adding .025% by weight of tertiary butyl catechol, 10% by weight of glycol dimethacrylate resin coated glass fiber of about $\frac{1}{8}''$ length, and enamel color. To the filled gel thus prepared another $\frac{1}{10}$ of 1% by weight of tertiary butyl hydroperoxide is added as additional catalyst and bleach just before the gel is placed in the molding recesses or concavities of the face part mold.

Other resins of the class specified above may be used in a manner similar to that set forth for the aforementioned #5003 and #5403 resins. For example, Selectron resins #5016 and #5401 may be used. These respectively are like the #5003 and #5403 resins except that #5016 sets faster and #5401 comprises styrene instead of diallylphthalate. Other catalysts than tertiary butyl hydroperoxide and tertiary butyl perbenzoate may be used. For example benzoyl peroxide, di-tertiary butyl diperphthalate, hydroxycyclohexylhydroperoxide, or mixtures thereof may be used. As accelerators or promoters mercaptans and amine compounds may be used, in quantities, for example, of from .01 of 1% to 1% by weight of the resin. Other inhibitors may be used but preferably the inhibitor should be one, like the tertiary butyl catechol, that decomposes below the minimum temperature used for curing the gel so as to insure non-interference by the inhibitor with the complete and final polymerization or curing of the gel. The catechol has this property, in that it decomposes or becomes ineffective or non-active at temperatures above about 160° F.

Pigments are preferably added to the gel along with and at the same time the glass fiber is added, in an amount (for example about .08 gram for a batch as in Example VI) and in colors which provide a satisfactory appearance for the cured enamel tooth part. The reinforcing or abrasion resistant filler should have approximately the same index of refraction as the cured enamel or gel, so that the light transmitting properties of the tooth plastic are not objectionably interfered with by the filler. This can be done with a glass fiber filler and the enamel forming resin compositions described above. A fluorescent material may be incorporated in the coloring material or pigment to give the tooth a more lifelike appearance, particularly under artificial light.

For best results, the gel should be of the proper rubber-like consistency when the finish mold is closed. If the gel is too thin or soft porosity and fiber separation at the mold parting line may result; if too hard undue opacity, visible blend lines, heavy flash at the parting line and weak enamel-body bonds may occur.

While the drawings show an embodiment of the invention as practiced with four piece molds, it will be understood that three piece molds (see Example X) or other types of molds may also be used. For example, transfer or injection molds and mold processes can also be used to form the body and/or enamel tooth parts with the compositions described above. Formation of the body parts by injection molding and subsequently molding and bonding the enamel gel thereto by transfer molding has been found particularly useful. Of course anterior teeth may be formed according to the invention as well as the posterior teeth shown in the drawings, merely by using anterior rather than posterior molds.

By following the teachings of the present disclosure novel artificial teeth may be made which have greatly improved properties as compared with the all acrylic and other synthetic plastic teeth now commercially available. These improved properties comprise increased strength, hardness and abrasion resistance, better retention of color and surface gloss, less cold flow, more adequate resistance to sterilizing fluids and temperatures, greater resistance to ageing, lower water absorption and greater dimensional stability both at room temperatures and at elevated temperatures. Further, artificial teeth manufactured in accordance with the invention are tasteless, odorless, non-toxic and non-irritating to the mouth tissues. They can readily be bonded securely to the denture plate like acrylic teeth, yet ground and polished like porcelain teeth.

It is to be understood that the invention is not limited to the specific embodiment or the preferred form herein specifically illustrated and described, but may be used in other ways without departure from its spirit as defined by the following claims.

I claim:

1. An artificial tooth having a wearing surface portion comprising the copolymerization product of an olefinically unsaturated monomer containing at least one $>C=CH_2$ group and an unsaturated polyester resulting from the condensation of a dihydric alcohol with an alpha-beta ethylenically unsaturated substance selected from the group consisting of a dicarboxylic acid and its anhydride, said copolymer containing, by weight of said monomer and said polyester from about 10% to about 50% of said monomer.

2. An artificial tooth having a wearing surface portion comprising the copolymerization product of an olefinically unsaturated monomer containing at least one $>C=CH_2$ group and an unsaturated polyester formed by the reaction of a dihydric alcohol with a substance selected from the group consisting of maleic and fumaric acids and their anhydrides, said copolymer containing, by weight of said monomer and said polyester, from about 10% to about 50% of said monomer.

3. An artificial tooth having a wearing surface portion comprising the copolymerization product of a substance selected from the group consisting of styrene, diallyl phthalate and vinyl acetate and an unsaturated polyester of a dihydric alcohol and a substance selected from the group consisting of maleic and fumaric acids and their anhydrides, said copolymer containing, by weight of said first named substance and said polyester, from about 50% to about 90% of said polyester.

4. An artificial tooth having a wearing surface portion comprising a copolymer of a polymerizable substance selected from the group consisting of styrene, diallyl phthalate and vinyl acetate and a polymerizable polyester comprising a reaction product of a dihydric alcohol selected from the group consisting of ethylene glycol and propylene glycol and an acid selected from the group consisting of maleic acid, fumaric acid and their anhydrides, said copolymer containing, by weight of said first-named substance and said polyester, from about 50% to about 90% of said polyester.

5. A tooth restoration having a surface portion which is exposed when said restoration is in place in the oral cavity, said surface portion being composed of a copolymer of an olefinically unsaturated monomer in an amount from about 10% to about 50% by weight and an unsaturated polyester in an amount from about 90% to about 50% by weight, said polyester being the esterification product of a dihydric alcohol and an alpho-beta ethylenically unsaturated dicarboxylic acid or anhydride, said copolymer being reinforced with an abrasion resistant glass fiber coated with a resin selected from the group consisting of dimethacrylate, phenol-formaldehyde, polyamide, butyl methacrylate, polyvinyl butyral, polyvinyl acetal, polyvinyl formal.

6. A tooth restoration having a surface portion which is exposed when said restoration is in place in the oral cavity, said surface portion being composed of a copolymer of an olefinically unsaturated monomer in an amount from about 10% to about 50% by weight and an unsaturated polyester in an amount from about 90% to about 50% by weight, said polyester being the esterification product of a dihydric alcohol and an alpha-beta ethylenically unsaturated substance selected from the group comprising dicarboxylic acid or its anhydride and modified by the substitution of a functionally saturated dicarboxylic acid or anhydride for a portion of said unsaturated dicarboxylic acid or anhydride.

7. A composite artificial tooth having an enamel portion composed at least in part of a thermoset copolymer formed by the interpolymerization of a polymerizable substance containing at least one C=CH₂ group and a polymerizable substance which is a polyester of a dihydric alcohol and a substance selected from the group consisting of an alpha-beta ethylenically unsaturated dicarboxylic acid and its anhydride, said tooth having a body portion composed at least in part of a moldable thermoplastic synthetic resinous material which is chemically bonded to said copolymer material.

8. A composite artificial tooth according to claim 7, in which said copolymer is formed by the interpolymerization of styrene with the polyester of an alcohol selected from the group consisting of ethylene glycol and propylene glycol and a substance selected from the group consisting of maleic and fumaric acids and their anhydrides, and in which said moldable material of said body part is a thermoplastic resin selected from the group consisting of methyl methacrylate, ethyl methacrylate, polystyrene, cellulose acetate, polyamide resin, polyvinyl chloride, vinyl acetate, vinyl acetate-vinyl chloride copolymer, and mixtures or copolymers thereof.

9. As an article of manufacture and sale, a posterior artificial tooth having buccal, occlusal, lingual and gingival surface portions, said occlusal surface portion comprising a copolymer having a polyester resin as a major constituent thereof and said gingival portion comprising a moldable material having an acrylic resin as a major constituent thereof, said portions being chemically bonded together.

10. As an article of manufacture and sale an anterior artificial tooth having labial, incisal, lingual and gingival surface portions, said incisal surface portion comprising a copolymer having a polyester resin as a major constituent thereof and said gingival portion comprising a moldable material having an acrylic resin as a major constituent thereof, said portions being chemically bonded together.

11. An artificial tooth having a body portion and an enamel portion, at least one of said portions comprising a synthetic plastic formed by the polymerization of styrene with a substance formed by the reaction product of propylene glycol and maleic acid modified with phthalic acid, in approximately the following proportions, by weight:

| | Parts |
|---|---|
| Styrene | 3100 |
| Propylene glycol | 2686 |
| Maleic acid | 1575 |
| Phthalic acid | 2378 |

12. An artificial tooth having a body portion and an enamel portion, at least one of said portions comprising a synthetic resinous material formed by the polymerization of styrene with a substance formed by the reaction of propylene glycol and maleic acid, in approximately the following proportions, by weight:

| | Parts |
|---|---|
| Styrene | 3180 |
| Maleic acid | 3920 |
| Propylene glycol | 3344 |

13. An artificial tooth having a body portion and an enamel portion, at least one of said portions comprising a synthetic resinous material formed by the polymerization of styrene with a substance formed by the reaction of fumaric acid, maleic anhydride, phthalic anhydride, ethylene glycol and propylene glycol, in approximately the following proportions, by weight:

| | Parts |
|---|---|
| Fumaric acid | 7 |
| Maleic anhydride | 1 |
| Phthalic anhydride | 1.2 |
| Ethylene glycol | 3.3 |
| Propylene glycol | 2.3 |

14. An artificial tooth having a body portion and an enamel portion, at least one of said portions comprising a synthetic resinous material formed by the polymerization of diallyl phthalate with a substance formed by the reaction of fumaric acid, ethylene glycol and propylene glycol, in approximately the following proportions, by weight:

| | Parts |
|---|---|
| Fumaric acid | 7 |
| Ethylene glycol | 3.3 |
| Propylene glycol | 1 |

15. In a method of molding a synthetic resinous tooth restoration, the steps of; separately molding a part of said tooth from synthetic resinous material, partially polymerizing a synthetic resin material to the viscid gel stage, treating said partially polymerized resin with an inhibitor to maintain it in said viscid gel stage, impregnating said viscid gel with a reinforcing and abrasion resistant filler, catalyzing said impregnated gel to further polymerize said resin to the rubbery gel stage, and molding said rubbery gel to said separately formed part of said restoration to simultaneously complete the cure of said gel and bond it to said separately formed part.

16. In a method of molding a synthetic resinous tooth restoration, the steps of; separately molding a part of said tooth from synthetic resinous material, partially polymerizing a liquid synthetic resin material to a viscid gel stage, treating said partially polymerized resin with an inhibitor to maintain it in said viscid gel stage, subjecting said viscid gel to radiant energy to overcome the effect of said inhibitor and advance polymerization of said gel, and molding said gel to said separately formed part of said restoration simultaneously to complete the cure of said gel and bond it to said separately formed part.

17. The method of molding a composite synthetic resin tooth restoration comprising a body part and an enamel part bonded thereto, said method comprising the steps of molding between face and back molds from synthetic resinous material a body part of a tooth, removing the face mold, preparing an enamel layer for said tooth by partially polymerizing a liquid synthetic resin to a viscid gel stage, treating said partially polymerized resin with an inhibitor to maintain it in said viscid gel stage, subjecting said viscid resin to radiant energy to render said inhibitor ineffective and advance polymerization of said resin, placing said partially polymerized resin between a second face mold and said back mold containing said molded body part, and subjecting said molds and resins therein to heat and pressure to cure said partially polymerized resin and bond it to said body part.

18. The method of molding a composite synthetic resin tooth restoration comprising a body part and an enamel part bonded thereto, said method comprising the steps of molding between face and back molds from synthetic resinous material a body part of a tooth, removing the face mold, preparing an enamel layer for said tooth by partially polymerizing a liquid synthetic resin to a viscid gel stage, treating said partially polymerized resin with an inhibitor to maintain it in said viscid gel stage, mixing abrasion resisting material with said viscid resin, subjecting said viscid resin to radiant energy to render said inhibitor ineffective and advance polymerization of said resin, placing said partially polymerized resin between a second face mold and said back mold containing said molded body part, and subjecting said molds and resins therein to heat and pressure to cure said partially polymerized resin and bond it to said body part.

19. The method of molding a composite synthetic resin tooth restoration comprising a body part and an enamel part bonded thereto, said method comprising the steps of molding between face and back molds from synthetic resinous material a body part of a tooth, removing the face mold, preparing an enamel layer for said tooth by partially polymerizing a liquid synthetic resin to a viscid gel stage, treating said partially polymerized resin with an inhibitor to maintain it in said viscid gel stage, subjecting said viscid resin to radiant energy to render said inhibitor ineffective and advance polymerization of said resin, applying a coating of said liquid synthetic resin to the exposed surfaces of said molded body part when in said back mold, placing said partially polymerized resin between a second face mold and said back mold containing said coated molded body part, and subjecting said molds and resins therein to heat and pressure to cure said partially polymerized resin and bond it to said body part.

References Cited in the file of this patent

UNITED STATES PATENTS

| | | |
|---|---|---|
| 1,129,336 | Critcherson | Feb. 23, 1915 |
| 2,230,164 | Myerson | Jan. 28, 1941 |
| 2,255,313 | Ellis | Sept. 9, 1941 |
| 2,288,321 | Nordlander et al. | June 30, 1942 |
| 2,314,957 | Thornton et al. | Mar. 30, 1943 |
| 2,370,623 | Gibson, Jr. | Mar. 6, 1945 |
| 2,391,925 | Saffir | Jan. 1, 1946 |
| 2,406,298 | King | Aug. 20, 1946 |
| 2,477,268 | Saffir | July 26, 1949 |
| 2,477,791 | Foster et al. | Aug. 2, 1949 |
| 2,514,141 | Phillips | July 4, 1950 |